3,212,967
BIOCIDALLY-ACTIVE MIXED PHOSPHOROTHIO-
ATE ESTER-CONTAINING AND MIXED PHOS-
PHORAMIDATE ESTER - CONTAINING POLY-
MERIC MATERIALS
Russell T. McFadden, Freeport, and Ralph R. Langner
and Lisby L. Wade, Lake Jackson, Tex., assignors to
The Dow Chemical Company, Midland, Mich., a cor-
poration of Delaware
No Drawing. Filed Nov. 5, 1962, Ser. No. 235,519
47 Claims. (Cl. 167—42)

This invention relates to organic, polymeric materials which have biocidal properties.

Mixed phosphorothioate ester materials of themselves are known to be active as parasiticides and herbicides and are adapted to be employed as active toxic constituents of compositions for the control of bacteria, fungi, mites, undesirable vegetation and insect organisms. The mixed phosphoramidate ester materials are known to be useful for the systemic control of parasites attacking warm-blooded animals. In addition, the mixed phosphoramidate ester materials may also be employed to advantage as constituents of insecticidal and microbicidal compositions, as well as in herbicidal compositions. It is further known that these mixed ester materials may be applied to parasitic, insect and fungal organisms or their habitats in suitable amounts to obtain excellent control of many parasitic and fungal organisms which attack the hides of domestic animals, as well as terrestrial plant seeds, roots or aboveground or aerial portions of plants. Such practice protects domestic animals from parasite and insect infestation, irritation and infection and protects the desirable plants or their seeds from the ravages of plant-attacking fungi which, in turn, improves the crop yield, as well as the emergence and growth of seedlings, without substantial injury to the crops, plants or plant parts. Additionally, the instant biocidal compounds may be applied in dormant applications to the interior walls of stables, as well as on the woody surfaces of terrestrial plants or to orchard floor surfaces to attain control of the overwintering spores of fungi and parasites.

Those known utilities of the mixed phosphorothioate and phosphoramidate ester materials, hereinafter employed in the present invention, usually provide adequate temporary protection when carefully applied to an unprotected substrate by such conventionally employed means as washes, dips, sprays, dusts and the like formulations. However, those coating treatments are frequently wrought with a number of disadvantageous characteristics which, in the long run, result in dissatisfactory performance. Among the undesirable characteristics of those applied coatings are poor resistance to rain, wind and/or sunlight; poor adhesion to dirty or dusty substrates; disadvantageously high initial activity with comparatively low residual or prolonged activity; and, in the cases wherein applications of some aqueous emulsions of these biocidally-active materials are employed, poor wetting and covering of oily and waxy surfaces have been experienced.

Accordingly, it would be desirable and it is an object of the present invention to provide organic, ethenoid polymeric materials by polymerizing ethenoid monomers having incorporated therein these biocidal compounds.

It is a resultant object of the present invention to provide biocidally-active, water-insoluble, organic, ethenoid polymeric materials wherein the particular biocidal component and the polymerizable ethenoid monomeric components are polymerized to form unitary polymeric molecules having the biocidal component temporarily held therein.

Another object of the invention is to provide such biocidally-active, ethenoid polymeric materials that possess substantially improved and prolonged residual biocidal activity.

A further object of the invention is to provide such biocidally-active, ethenoid polymeric materials that can be adapted to be employed as film-forming coatings.

An additional object of the invention is to provide such biocidally-active, ethenoid polymeric materials having reduced toxicity to the host, both plants and animals, due to the substantially slower rate of release of the biocidal component from the polymeric material in which it is entrapped.

And still another object of the present invention is to provide such biocidally-active, water-insoluble, organic, ethenoid polymeric materials in latex and organic solvent-soluble forms (1) which, as aqueous latex dispersions, are capable of supporting substantial dilution without appreciable loss of cohesive binding power; (2) that, as coating materials, possess improved durability to out-of-door weathering; (3) that, as latexes, provide stable and non-precipitating emulsions; (4) that, as latex or solvent-soluble coating materials, cause the biocidal component of the polymer to wet and adhere to surfaces more tenaciously; and (5) that, as latex coatings, advantageously prolong the residual activity of the biocidal component by means of a slow, steady releasing or exuding of the biocidally-active component from the filmaceous coating composed of a mass of adhesive, cohesive, biocidally-active, polymeric molecules.

In view of the highly desirable inherent characteristics of the biocidally-active polymers of the present invention, it was discovered that these polymers, as aqueous latex dispersions, in addition to their recognized fields of utility, find particularly advantageous employment as coating materials for application in the treatment of domestic animals for warding off insects, parasites and other troublesome pests.

The biocidally-active, water-insoluble, organic, ethenoid polymeric latexes of the invention are easily and efficiently produced by means of conventional polymerization methods employed for the preparation of various known organic polymers without detriment to the useful activity of the biocidal compound which is intimately combined in these polymers. Rather, it has been discovered that the inclusion of the mixed phosphorothioate and phosphoramidate ester biocidal compounds contemplated within the scope of the present invention in the novel biocidally-active, polymeric materials have made possible the preparation of coating materials which possess substantially improved adhesion properties when coated onto a variety of substrates. In addition, these biocidally-active coating materials demonstrate significantly improved weatherability, as well as beneficially prolonged biocidal activity.

The invention is, therefore, directed to biocidally-active, organic, ethenoid polymeric materials wherein at least one biocidal component, a mixed phosphorothioate ester and/or a mixed phosphoramidate ester, and at least one polymerizable monomeric component are intermixed prior to emulsion, mass, solution or suspension polymerizing of the latter.

By the expressions "biocidally-active component," "biologically-active compound," "bioactive compound," "biologically-active substance" and the like is meant those compounds or compositions known and used to inhibit, repel, exterminate or otherwise alter the normal activities of insects, molds, fungi, bacteria, protozoa, viruses, plants, invertebrates worms and the like.

The biocidally-active, organic, ethenoid polymeric materials of the present invention comprise the incorporation of certain mixed esters of phosphorothioate and phosphoramidate compounds including O-aryl O,O-di(lower alkyl) phosphorothioate parasiticidal compounds having the formula:

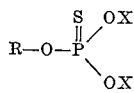

wherein R represents a phenyl radical unsubstituted or substituted by one or more substituents, such as chlorine, bromine, lower alkyl, lower alkoxy, phenyl, nitrophenyl, benzyl or cyclohexyl and X represents lower alkyl. The term "lower alkyl" refers to the radicals containing from 1 to 5 carbon atoms, inclusively.

Representative members of the above group of parasiticidally-active mixed phosphorothioate esters which may be employed in the biocidally-active, organic, polymeric latexes of the invention include:

O-(4-benzylphenyl) O,O-dipropyl phosphorothioate;
O-(2-methoxyphenyl) O,O-dibutyl phosphorothioate;
O-(2-ethyl-4-bromophenyl) O,O-diamyl phosphorothioate;
O-(anthracyl) O,O-diisopropyl phosphorothioate;
O-(4-cyclohexylphenyl) O,O-diethyl phosphorothioate;
O-(2-ethoxy-4-chlorophenyl) O,O-di-tert.-butyl phosphorothioate;
O-(2-biphenylyl) O,O-diamyl phosphorothioate;
O-(2-bromo-4-propoxyphenyl) O,O-dimethyl phosphorothioate;
O-(2-bromo-4-chlorophenyl) O,O-dipropyl phosphorothioate;
O-(4-tert.-butylphenyl) O,O-diethyl phosphorothioate;
O-(2-chlorophenyl) O,O-di-sec.-butyl phosphorothioate;
O-(3,4-dibromophenyl) O,O-diamyl phosphorothioate;
O-(metacresyl) O,O-diisopropyl phosphorothioate;
O-(2-ethylphenyl) O,O-diethyl phosphorothioate;
O-(2,4-dichlorophenyl) O,O-dimethyl phosphorothioate;
O-(2-chloro-4-tert.-butylphenyl) O,O-dimethyl phosphorothioate;
O-(β-napthyl) O,O-dimethyl phosphorothioate;

and particularly utile for incorporation in the biocidally-active, organic, ethenoid polymeric latexes of the invention is O-(2,4,5-trichlorophenyl) O,O-diethyl phosphorothioate; and most particularly are O-(2,4,5-trichlorophenyl) O,O-dimethyl phosphorothioate; O,O-diethyl O-p-nitrophenyl phosphorothioate and O,O-dimethyl O-p-nitrophenyl phosphorothioate.

Although other methods of prepartion of mixed phosphorothioate esters are known in the art, it is preferred to use mixed phosphorothioate esters that are prepared by means of the method of manufacture set forth in United States Letters Patent No. 2,928,864, issued to Edward J. Tabor on March 15, 1960.

Briefly described, the Tabor method comprises reacting in the absence of a catalyst and at a temperature of from 40° to 70° C. one molecular proportion of an O,O-di(lower alkyl)phosphorochloridothioate with a mixture comprising at least one molecular proportion of each of an alkali metal hydroxide and a phenolic compound having the formula ROH wherein R represents an aryl radical, said alkali metal hydroxide being employed in the form of an aqueous solution containing at least 10 percent by weight of the alkali metal hydroxide. The reaction takes place smoothly under these described conditions with the production of the desired mixed phosphorothioate esters in high yields and excellent purity.

Other mixed phosphorothioate esters having parasiticidal activity, that are contemplated as biocidal components for incorporation in the biocidally-active, organic, ethenoid polymeric materials of the invention, include O - (2,6-dicyclohexyl-4-lower-alkylphenyl) O,O-dimethyl phosphorothioates having the formula:

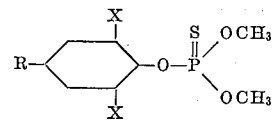

In this formula, X represents a cyclohexyl radical and R represents a lower alkyl radical, i.e., an alkyl radical containing from 1 to 4 carbon atoms, inclusively. These compounds are viscous liquids, somewhat soluble in organic solvents and of very low solubility in water.

Exemplary compounds of the genera described immediately above that can be employed in the biocidally-active, organic, ethenoid polymeric materials of the invention are:

O-(2,6-dicyclohexyl-4-methylphenyl) O,O-dimethyl phosphorothioate;
O - (2,6-dicyclohexyl-4-isopropylphenyl) O,O-dimethyl phosphorothioate;
O-(2,6 - dicyclohexyl-4-sec.-butylphenyl) O,O - dimethyl phosphorothioate;
O - (2,6-dicyclohexyl-4-ethylphenyl) O,O-dimethyl phosphorothioate;
O-(2,6-dicyclohexyl-4-normal-propylphenyl) O,O-dimethyl phosphorothioate;
O - (2,6 - dicyclohexyl - 4 - normal-butlyphenyl) O,O-dimethyl phosphorothioate; and the like.

A suitably detailed method of preparing the above cyclohexyl-containing phosphorothioate compounds is set forth in United States Letters Patent No. 2,897,226, issued July 28, 1959, to inventors, Edgar C. Britton and Henry Tolkmith. In brief, these compounds may be prepared by the reaction of an O,O-dimethyl phosphorochloridothioate, CIPS (OCH$_3$)$_2$, with a potassium or sodium 2,6-dicyclohexyl-4-lower-alkylphenolate having the formula:

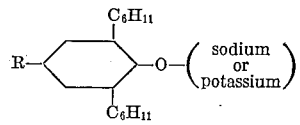

The reaction is carried out in the presence of an inert organic solvent, such as toluene or benzene, and in the presence of a tertiary amine, such as pyridine. The tertiary amine catalyzes the reaction between the phosphorochloridothioate and alkali metal phenolate reagent. In the absence of the tertiary amine, the reaction proceeds slowly. Good results are obtained when employing substantially equimolecular proportions of the phenolate and phosphorochloridothioate reagent and an amount of catalyst of 0.1 mole or more per mole of the phosphorochloridothioate reagent. The reaction takes place smoothly within the temperature range of from 30° to 80° C. with the formation of the desired product. Upon completion of the reaction, the desired product is separated in conventional fashion.

Additional types of phosphorothioate ester compounds that are capable of parasiticidal and herbicidal activity and which are further contemplated as useful biocidal components for present purposes include: O-(chlorophenyl) O-(chlorophenoxyethyl) phosphorothiates having the formula:

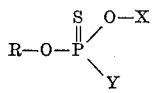

In this formula, R represents chlorophenyl, X represents chlorophenoxyethyl and Y represents a lower alkoxy group containing not more than 4 carbon atoms or an amido group. These compounds are crystalline solids or viscous liquids somewhat soluble in organic solvents and substantially insoluble in water.

Several specific species included within the utile genera described immediately above are:

O-(2,4,5-trichlorophenyl) O-2-(2,4,5-trichloro-
phenoxy)ethyl N-isopropyl phosphoramidothioate;
O-(2,4-dichloro-5-methylphenyl) O-2-(4-chloro-2-
methylphenoxy)ethyl N-benzyl phosphoramidothioate;
O-(2,4,5-trichlorophenyl) O-methyl O-2-(2,4,5-
trichlorophenoxy)ethyl phosphorothioate;
O-(2,4,5-trichlorophenyl) O-sec.-butyl O-2-(4-
chloro-2-methylphenoxy)ethyl phosphorothioate;
O-(4-chlorophenyl) O-2-(2,4-dichlorophenoxy)ethyl
N-methyl phosphoramidothioate;
O-(2,4-dichlorophenyl) O-2-(3,4-dichlorophenoxy)ethyl
N-ethyl phosphoramidothioate;
O-(3,4-dichlorophenyl) O-ethyl O-2-(4-chlorophenoxy)
ethyl phosphorothioate;
O-(2-chlorophenyl) O-isopropyl O-2-(2,4,5-trichloro-
phenoxy)ethyl phosphorothioate; and particularly
O-(2,4-dichlorophenyl) O-methylisopropyl phosphor-
amidothioate; and the like.

Two highly satisfactory methods for the preparation of the parasiticidal and herbicidal phosphorothioates and phosphoramidothioates, described supra, are taught in United States Letters Patent No. 2,831,015, issued April 15, 1958, to the inventor, Henry Tolkmith.

In one method (detailed in this H. Tolkmith patent) for preparing the compounds containing an amido group, an amine is reacted with a phosphorochloridothioate of the formula

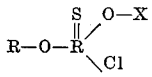

The reaction is carried out in the presence of an inert organic solvent, such as benzene, toluene or ether. The reaction is somewhat exothermic and takes place smoothly in alcoholate. In carrying out the reaction, the alcoholate, preferably as the sodium salt, is added portionwise at the reaction temperature to the phosphorochloridothioate reagent dispersed in the reaction solvent. Upon completion of the reaction, the reaction mixture is washed with water to remove the sodium chloride and the solvent removed by evaporation to obtain the desired product as a residue.

In another method of the instant H. Tolkmith patent, the O-(chlorophenyl) O-lower-alkyl O-(chlorophenoxy-ethyl) phosphorothioates and O - (chlorophenyl) O-(chlorophenoxyethyl) phosphoramidothioates contemplated within the scope of biocidal components employed in the practice of the present invention may be prepared by reacting equimolecular proportions of a sodium chlorophenoxyethylate and a phosphorochloridothioate of the formula:

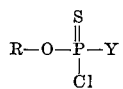

The conditions of reaction, contacting of the reagents, and methods of separation are as described above for the alkali metal alcoholate reaction.

The novel biocidally-active, organic, ethenoid polymeric materials of this invention also include the employment as reactants of phosphoramidates having the formula:

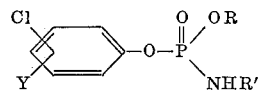

In this formula, R represents a lower alkyl radical containing from 1 to 4 carbon atoms, inclusively, R' is selected from the group consisting of hydrogen and a lower aliphatic radical containing from 1 to 4 carbon atoms, inclusively, and Y is selected from the group consisting of a lower alkyl radical containing from 1 to 5 carbon atoms, inclusively, and a halogen having an atomic number of 17 to 35.

These phosphoramidates are colorless or light-colored liquids or low-melting solids, soluble in many organic solvents and substantially insoluble in water.

Phosphoramidates of the genera exemplified supra that may be advantageously polymerically combined in the instant biocidally-active, organic, ethenoid polymeric materials comprise:

4-tert.-butyl-2-chlorophenyl methyl tert.-butylphosphora-
midate;
4-tert.-butyl - 2 - chlorophenyl normal-butyl methylphos-
phoramidate;
2-chloro-4-isopropylphenyl isopropyl methylphosphora-
midate;
2-chloro-4-methylphenyl ethyl methylphosphoramidate;
4-chloro-o-tolyl methyl methylphosphoramidate;
4-tert.-butyl-2-chlorophenyl methyl phosphoramidate;
2-chloro-4-(1,1 - dimethylpropyl)phenyl methyl methyl-
phosphoramidate;
2-chloro-p-tolyl isopropyl phosphoramidate;
4-chloro-2-ethylphenyl ethyl phosphoramidate;
5-tert.-butyl-2-chlorophenyl normal-propyl phosphorami-
date; and the like.

The phosphoramidates that are particularly valuable as biocidally-active components of the instant polymeric materials are those which have the structure:

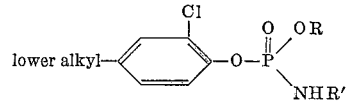

wherein R and R' represent a lower alkyl radical containing from 1 to 4 carbon atoms and particularly when R is methyl or ethyl and "lower alkyl" refers to an alkyl radical containing from 1 to 5 carbon atoms, and particularly when "lower alkyl" is tert.-butyl, tert.-amyl or isopropyl. Included as particularly valuable species of the above group are:

4-tert.-butyl-2-chlorophenyl methyl methylphosphorami-
date;
4-tert.-butyl-2-chlorophenyl methyl ethylphosphoramidate;
4-tert.-butyl-2-chlorophenyl methyl isopropylphosphora-
midate; and
2-chloro-4-isopropylphenyl ethyl methylphosphoramidate;

Various methods may be employed in the preparation of the phosphoramidates. The preferred procedure consists of reacting a haloaryl phosphorodichloridate having the structure:

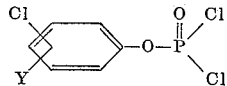

with a lower aliphatic alcohol, ROH, to form an intermediate haloaryl alkyl phosphorochloridate having the structure:

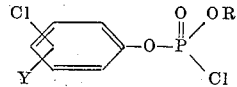

followed by reacting the latter with ammonia or a lower aliphatic amine represented by the structure R'NH₂, to produce the desired phosphoramidate, previously defined. Good yields are obtained in preparations employing substantially equimolar proportions of haloaryl phosphorodichloridate and lower aliphatic alcohol and a mole excess of ammonia or lower aliphatic amine. The reaction may be carred out in an inert organic solvent, such as methylene chloride, chlorobenzene, chloroform, benzene and ether. The reaction between the haloaryl phosphorodichloridate and lower aliphatic alcohol is carried out at a temperature of from about 10° C. to 100°–110° C. The reaction usually is exothermic and temperature control may be maintained by heating or cooling as required. The reaction between the haloaryl alkyl phosphorochloridate and lower aliphatic amine is carried out at a temperature of from 3° to 60° C. with such rate of addition and cooling or heating as required to maintain the temperature in the desired range. The by-product in both steps of the reaction is hydrogen chloride. In the first step, the latter is allowed to exit from the reaction mixture as a gas. In the second step, the hydrogen chloride is removed preferably as a hydrochloride salt of the amine or ammonia. Following completion of the reaction, the phosphoramidate is separated by conventional means. More explicit details of the preparation and utility of the instant compounds are set forth in United States Letters Patent No. 2,929,762, issued March 22, 1960, to inventors, Joseph L. Wasco, Lisby L. Wade and James F. Landrum.

The polymerizable, organic, ethenoid monomeric components employed in the preparation of the biocidally-active mixed phosphorothioate ester-containing or mixed phosphoramidate-containing, ethenoid polymeric materials of the invention are selected from polymerizable olefinic compounds, such as $C_1$–$C_{18}$ primary and secondary alkyl esters of acrylic acid including methyl acrylate, ethyl acrylate, propyl- and isopropyl acrylates, butyl-, isobutyl- and sec.-butyl acrylates, amyl- and isoamyl acrylates, hexyl acrylate, 2-ethylhexyl acrylate, octyl acrylate, 3,5,5-trimethylhexyl acrylate, decyl acrylate, dodecyl acrylate, octyl acrylate, octadecyl acrylate, octadecenyl acrylate; glycidyl esters of monoethylenically unsaturated aliphatic monocarboxylic acids, such as glycidyl acrylate; $C_1$–$C_{18}$ primary and secondary alkyl esters of methacrylic acid, such as n-amyl methacrylate, sec.-amyl methacrylate, methyl-, ethyl-, propyl- and butyl methacrylates, hexyl methacrylate, 2-ethylbutyl methacrylate, octyl methacrylate, 3,5,5-trimethylhexyl methacrylate, decyl methacrylate, dodecyl methacrylate, octadecyl methacrylate; diesters of alkylenediols with monoethylenically unsaturated aliphatic monocarboxylic acids, such as diethylene glycol dimethacrylate; acrylic acid; methacrylic acid; maleic acid; fumaric acid; crotonic acid; acrylonitrile; methacrylonitrile; various monovinyl aromatic hydrocarbons of the benzene series characterized by the general formula:

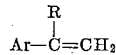

wherein Ar, selected independently, represents an aromatic hydrocarbon and a nuclear halohydrocarbon radical and R is selected from the group of substituents consisting of hydrogen, a $C_1$–$C_4$ alkyl radical and a halogen having an atomic number of from 17 to 35, including styrene, α-methylstyrene, o-methylstyrene, p-methylstyrene, m-methylstyrene, ar-ethylstyrene, propylstyrenes, butylstyrenes, ar-chlorostyrene, ar-bromostyrene and the like; open-chain aliphatic conjugated dienes containing from 4 to 9 carbon atoms, such as butadiene, isoprene and the like; as well as vinyl ester and ether monomers including vinyl acetate, vinyl propionate, vinyl butyrate, allyl glycidyl ether and the like; vinyl chloride and vinylidene chloride.

Since certain changes may be made in the above polymerizable monomeric components, and since different embodiments of the invention could be made without departing from the scope thereof, it is intended that all matter contained in the above description shall be interpreted as illustrative only and not in a limiting sense. Thus, the term "monomer" implies a single monomer or a mixture of two or more monomers and the term "polymer" implies a homopolymer of a copolymer of two or more monomers.

An emulsifier is generally employed in emulsion and suspension polymerization practices, preferably in an amount in the range of from about 0.1 to 15 percent based on monomer weight, and may be of the anionic, cationic or nonionic type. While it is desirable to have an anionic emulsifier, it is not detrimental if a small amount, i.e. from 10 to 15 percent, of a nonionic emulsifier based on monomer weight is present or added after polymerization is complete. Representative compounds of the anionic type include aryl sulfonates, alkali metal alkyl sulfates, alkyl naphthalene sulfonate, n-octadecyldisodium sulfosuccinate, etc. When greater than about 10 to 15 percent of the emulsifier is employed, there is usually no proportional increase in benefits and the resulting latex may have such a propensity to foam as to detract from its utility as a coating composition. The optimum amount of emulsifier and specific type, other than being anionic, can easily be determined by someone familiar with the field. When less than about 0.1 percent is employed, the stability of the latex, its utility as a coating type polymeric composition and other properties suffer adversely.

Suitable catalysts are the peroxides, e.g. benzoyl peroxide, phthaloyl peroxide, naphthoyl peroxide, substituted benzoyl peroxides, acetyl peroxide, caproyl peroxide, lauroyl peroxide, cinnamoyl peroxide, acetyl benzoyl peroxide, sodium peroxide, hydrogen peroxide, di-tert.-butyl peroxide, tert.-butyl hydroperoxide, tetralin peroxde, 1-hydroxy cyclohexyl hydroperoxide-1, urea peroxide, etc., the percompounds, e.g. ammonium persulfate, sodium perchlorate, sodium perborate, potassium persulfate, etc., ozone, ozonides, etc., Lewis-acid type catalysts, e.g. aluminum chloride, stannic chloride, etc., metal compounds of unsaturated acids, such as, for instance, cobalt and manganese salts of linoleic acid, maleic acid, etc. Benzoyl peroxide is the preferred catalyst. The catalysts may be used alone or in admixture with one another. Any suitable amount of the catalyst or catalyst mixture may be used, but, in general, the catalyst concentration that gives satisfactory results may be within the range of 0.1 to 0.4 percent by weight of the entire polymerizable mass.

The action of the catalysts may be enhanced by the use of suitable promoters or activators. A catalyst-promoter system can enable the polymerization to proceed at room temperature and bring about the polymerization of the entire mass in a much shorter time. A number of nitrogeneous compounds, e.g. amines, especially aromatic and aliphatic tertiary amines, azo compounds, etc.; aromatic sulfinic acids, certain sulfites like dibutyl sulfite, etc.; long chain aliphatic mercaptans, e.g. dodecyl mercaptan, etc. are capable of promoting the action of catalysts like peroxides, percompounds like persulfates, etc. and bring about the polymerization at room temperature. The time required for such a polymerization will depend on the nature and amounts of the catalyst and promoter employed. In polymerizations of this type, it may be desirable to employ polymer or copolymer along with the monomer mixture. Polymerization conditions may further be modified by the application of heat, light, or heat and light, cooling at atmospheric, subatmospheric and atmospheric pressure.

The biocidally-active, organic, polymeric materials can be satisfactor ily prepared by employing several known methods for polymerizing the monomer, including emulsion, mass, solution and suspension polymerization techniques. The monomer containing the biocidal material, in solution, emulsion or suspension, can be polymerized by the aid of heat and/or light in the presence or absence of polymerization catalyst at subatmospheric, atmospheric or superatmospheric pressure. Instead of using all liquid monomeric material, it is possible to start with partially polymerized materials or with mixtures of biocide, monomers and partially polymerized materials. Another method of producing biocidally-active, polymeric latexes is to mix the monomer and biocide with a polymer and bring about the further polymerization of the entire mass by the application of heat and/or light in the presence or absence of polymerization catalyst at subatmospheric, atmospheric or superatmospheric pressure. However, it is an important feature of the invention that the instant mixed ester compounds be incorporated into the reaction mixture containing at least one polymerizable ethylenically unsaturated monomer at a stage in the polymerization reaction before the monomer is converted by polymerization into the finally polymerized polymer, thereby insuring uniform and homogeneous distribution of the biocide in the finally polymerized material.

In accordance with the practice for preparing the biocidally-active, organic, ethenoid polymeric materials of the present invention, an ethenoid monomer-biocide solution is prepared, said solution being comprised of from about 0.1 to about 75, and preferably from about 10 to about 50, weight percent of (A) at least one biocidally-active compound characterized by the general formula:

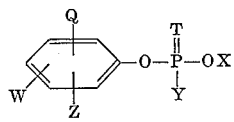

wherein Q, W and Z, taken independently and collectively, are selected from the group of substituents consisting of hydrogen, chlorine, bromine, nitro, lower alkyls containing from 1 to 5 carbon atoms, inclusively, lower alkoxy radical containing from 1 to 5 carbon atoms, phenyl, benzyl, cyclohexyl; T represents oxygen and sulfur; X represents a lower alkyl radical containing from 1 to 4 carbon atoms, inclusively, and a chlorophenoxyethyl radical; and Y represents a lower alkoxy radical containing from 1 to 5 carbon atoms, inclusively, and an —NHR radical (i.e. an amido group) wherein R is selected from the group of substituents consisting of hydrogen and a lower aliphatic radical containing from 1 to 4 carbon atoms, inclusively, and from about 25 to about 99.9, and preferably from about 50 to about 90, weight percent of (B) at least one polymerizable olefinically unsaturated monomer selected from the group consisting of (I) $C_1$–$C_{18}$ primary and secondary alkyl esters of acrylic acid; (II) glycidyl esters of monoethylenically unsaturated aliphatic monocarboxylic acids; (III) $C_1$–$C_{18}$ primary and secondary alkyl esters of methacrylic acid; (IV) diesters of alkylenediols with monoethylenically unsaturated aliphatic monocarboxylic acids; (V) acrylonitrile; (VI) methacrylonitrile; (VII) monovinyl aromatic hydrocarbons of the benzene series represented by the general formula:

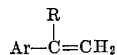

wherein Ar, selected independently, represents an aromatic hydrocarbon radical and a nuclear halohydrocarbon radical and R is selected from the group of substituents consisting of hydrogen, a $C_1$–$C_4$ alkyl radical, and a halogen atom having an atomic number of from 17 to 35; (VIII) open-chain aliphatic conjugated dienes containing from 4 to 9 carbon atoms, such as butadiene, isoprene and the like; (IX) vinyl esters of aliphatic monocarboxylic organic acids having from 2 to 4 carbon atoms in the alkyl substituent group; (X) allyl glycidyl ether; (XI) vinyl chloride; (XII) vinylidene chloride; and (XIII) an $\alpha,\beta$-monoethylenically unsaturated aliphatic carboxylic acid, the total compositional weight of components A and B being equal to 100 weight percent.

When emulsion or suspension polymerization techniques are employed to prepare the new biocidally-active polymers of the invention, a second solution is prepared by dissolving a catalyst and an anionic emulsifier in a suitable volume of water. The amount of water is not critical and will be in the order of from about 1 to about 1½ times by weight of the amount of monomer-biocide solution. The second solution is heated and the monomer-biocide solution is added thereto portionwise while maintaining the temperature of the reaction in the range of from about —20° C. to about 200° C. under autogenous pressure. The resulting polymeric material prepared in this manner will, upon completion of the polymerization reaction, contain from about 20 to about 75, and preferably from about 45 to about 55, weight percent non-volatiles at 140° C. and will have a biocide content of from about 1 to about 35 as based on the total weight of non-volatile latex solids.

When mass or solution polymerization techniques are used to produce the new biocidally-active, organic, ethenoid polymeric materials of the invention, one or more polymerization promoting and sustaining catalysts can be suitably admixed with the biocide-monomer solution prior to or after introducing the solution of reactants into the polymerization reactor. Also, if solution polymerization methods are employed, in addition to a catalytic agent, it is customary to include as the reaction medium, one or more inert organic solvents which are known to be miscible with the reactants. Frequently, the solvent reaction medium is also a suitable solvent for the reaction-formed polymeric product. The organic solvent solution of the new and useful biocidally-active, polymeric products may thus be employed as a coating per se; they may have suitable filler, pigments and other paint additives incorporated therein; or these polymer solutions can be employed as intermediates which may be further reacted with suitable crosslinking materials to produce other valuable plastic products. Suitable inert, organic solvents for present purposes may include various alkanols containing from 1 to 10 carbon atoms, toluene, xylene, benzene, high boiling petroleum liquids, esters, ketones, ethers, etc.

The range of polymerization temperatures to be employed in accordance with the four different polymerization techniques practiced herein to insure the production of a satisfactory biocidally-active polymer product in each instance is governed as to upper limit by (a) the temperature at which the polymer depolymerization rate commences to exceed the polymer formation or polymerization rate or (b) the temperature at which the stability of the biocidal component in the polymerizable monomeric mixture is threatened. A satisfactory lower temperature limit is determined by (c) determining the polymerization initiation and polymerization propagation temperatures required by the various monomer or monomers being polymerized or (d) determining the approximate temperature at which dissolution of the various generally solid biocidal components in the various polymerizable monomers can be accomplished.

The following examples are merely illustrative of the various polymerization practices suitable for preparing the biocidally-active, mixed phosphorothioate ester-containing and mixed phosphoramidate ester-containing polymeric materials of the present invention and are not to be construed as limiting the scope of the invention.

EXAMPLE I

Into a reaction vessel, equipped with means for stirring, temperature control, refluxing and purging, were introduced 1200 grams of distilled water, 50 grams of sodium octylphenoxy(polyethylene oxide)sulfonate and 50 grams of di - t - butylphenoxy(polyethylene oxide)$_{40}$.

The vessel was purged with nitrogen and thereafter the temperature of this aqueous solution was raised to 85° C., while the aqueous solution was stirred. Four and one half grams of sodium persulfate dissolved in 50 milliliters of water were added to the contents of the reaction vessel. Subsequently, a biocide-monomer solution, composed of 900 grams of butyl acrylate, 35 grams of methacrylic acid and 260 grams of O,O-dimethyl O-(2,4,5-trichlorophenyl) phosphorothioate, was added portionwise to the above-described aqueous phase. Completion of the diocide-monomer solution addition was accomplished over a period of 90 minutes. Thereafter, the temperature of the polymerization mixture was maintained at about 83° C. and was subsequently maintained thereat for an additional 90 minutes.

The emulsion polymer product, thus obtained, contained about 48 weight percent of non-volatile solids of which by analysis 25 weight percent was composed of the O,O - dimethyl O - (2,4,5 - trichlorophenyl) phosphorothioate and 23 weight percent was composed of the butyl acrylate/methacrylic acid polymer. Dried films cast of the biocidally-active, polymeric latex product were soft, tacky and transparent which indicated excellent compatibility of the polymer and biocidal components. It was noted that further dilution to any concentration with water of the latex product did not effect the stability of the latex emulsion. In addition, the latex emulsion demonstrated satisfactory stability in the presence of aqueous polyvalent metal salt solutions and it also showed very good freeze-thaw stability.

Self life stability of the biocide-polymer latex product was determined by diluting 1 part of the product with 100 parts of water. No settling out of the non-volatile solids content of the diluted latex occurred in a period of 30 days.

EXAMPLE II

To test the effectiveness of the biocide-polymeric latex product of Example I as an insecticide coating for application to the hides of domestic animals, the following procedure was employed.

The hides of several cows in three groups A, B, and C were treated by spraying with:

(A) A 5.0 weight percent aqueous dispersion of the biocidally-active/polymeric latex product of Example I;

(B) A 5.0 weight percent aqueous dispersion of the same biocide as was incorporated in the latex product of Example I, O,O-dimethyl O-(2,4,5-trichlorophenyl) phosphorothioate, which was prepared by emulsifying a xylene solution of the biocide;

(C) No treatment was given to this group of cows which was observed as an untreated control group.

Following seven days of exposure to conditions of weather and insects normally encountered in pasturing, Group B and Group C, which were treated and untreated, respectively, as described above, were observed to be infested with from 300 to 400 hornflies per head. In outstanding contrast, the hides of the cows of Group A having a 5 weight percent coating of the biocidally-active polymeric latex of Example I were free of infestation by hornflies despite the fact that they had encountered the same weather and insect conditions as had also been encountered by Group B and Group C.

EXAMPLES III–VIII

Employing standard emulsion polymerization procedures, wherein water, catalyst and emulsifier are placed and heated in a suitably equipped polymerization reactor which is subsequently purged with an inert gas and into which a pre-mixture of a biocide and at least one polymerizazble organic monomer is fed over a period of from about 30 minutes to about 2 hours, the following O,O-dimethyl O-(2,4,5-trichlorophenyl) phosphorothioate-containing organic, polymeric latexes were prepared. The polymerization temperatures; and the weight ratios in parts by weight of biocide to polymer in the various biocidally-active, polymeric latex products; the non-volatile solids content of the individual polymeric latex products; and the chemical identity of the organic polymer components of the biocidally-active latexes are shown hereinafter in Table I. Aqueous dispersions of these biocidally-active, polymeric latex products demonstrated compatibility of components and emulsion stability and non-volatile polymer solids were non-settling when the products were stored.

*Table I*

| Polymer Latex Component | Biocidal Component | Temp. of Polymerization, °C. | Biocide-Polymer, Parts by Weight | Latex Product Solids (Percent) |
|---|---|---|---|---|
| Ethyl acrylate | (1) | 80 | 3:1 | 45 |
| Styrene-ethyl acrylate | (1) | 80 | 1:1 | 45 |
| Styrene | (1) | 150 | 1:10 | 45 |
| Styrene-butadiene | (1) | 80 | 1:42 | 40 |
| Vinyl acetate | (1) | 80 | 1:19 | 65 |
| Vinyl acetate-ethyl acrylate | (1) | 80 | 1:1 | 45 |

[1] O,O-dimethyl O-(2,4,5-trichlorophenyl) phosphorothioate.

The art of mass and solution polymerization practices is well known. The mass and solution polymerization methods of the present invention appertain to the pre-addition of biocidally-active compounds into the polymerizable organic monomer prior to polymerization by mass and solution methods thereby providing a mass of unitary biocidally-active, organic polymer. Accordingly, these biocidally-active polymers can be subsequently dispensed by means of spraying, dusting and the like application techniques to obtain the previously discussed highly satisfactory results. In addition, the biocidally-active solid mass polymers of the invention can be milled and extruded. The preparation of biocidally-active, organic, polymeric materials of the present invention in accordance with these practices provide valuable novel polymers possessing substantially and beneficially prolonged biocidal activity, superior weatherability for out-of-door use and vastly better adherence to surfaces having coatings thereof.

EXAMPLE IX

Into a citrate bottle was placed 80 grams of butyl acrylate, 10 grams of O,O-dimethyl O-(2,4,5-trichlorophenyl) phosphorothioate and 1 gram of benzoyl peroxide. A magnetic stirring bar was fitted into the citrate bottle and the bottle purged with nitrogen and capped. The sealed citrate bottle and contents under autogenous pressure was placed into a magnetically stirred oil bath which was maintained at a temperature of 70° C. After several hours under the foregoing polymerization conditions, a viscous homogeneous biocidal-polymer product results. This product can be used per se, or, if preferred, it can be blended with other compatible polymers and/or it may be used as a dispersion by diluting the same in a suitable organic solvent.

EXAMPLE X

The biocidally-active, organic polymers of the invention are made by employing a solution polymerization procedure as follows:

In a two-liter, three-necked flask equipped with a stirring means, a reflux condenser and a thermometer were combined 500 grams of butyl acrylate, 100 grams of methacrylic acid, 3.0 grams of benzoyl peroxide, 150 grams of O,O-dimethyl O-(2,4,5-trichlorophenyl) phosphorothioate and 100 grams of ethyl alcohol. The reactants were heated, while being stirred, to a temperature of 70° C. The indicated reaction conditions were maintained for about 2 hours at which time an exothermic reaction occurred that was controlled by cooling the reaction flask with water. Also, additional alcohol was added to aid cooling and to reduce the viscosity of the reaction mixture. Thereafter, stirring of the reaction mixture was continued for about one hour at the end of which time the polymerization reaction was completed. A viscous polymer product was obtained. The biocidally-active viscous polymer, thus produced, could be utilized per se as a coating material. It also can be blended with other compatible polymers, if so required for certain applications and, likewise, the biocidally-active polymer product can be easily and effectively diluted with additional ethyl alcohol or other suitably miscible solvents. Further, it can be emulsified in water by the addition of suitable emulsifiers.

Accordingly, any biocide within the scope of the present invention that can be dissolved or adequately dispersed in the polymerizable ethenoid monomer or in the organic solvent reaction medium, when included, can be employed with any ethenoid monomeric system within the limits of the invention to prepare biocidally-active, organic, ethenoid polymeric materials by means of either mass or solution polymerization methods providing that the biocidal component does not inhibit the intended polymerization reaction.

The process of the present invention further comprises the preparation of biocidally-active, organic, ethenoid polymeric products by means of suspension polymerization techniques. The art of suspension polymerization methods is well established. However, the instant invention contributes to the advancement of the suspension polymer science by revealing a method whereby biocidally-active compound can be effectively incorporated as a polymerically bound component in a finished polymer. Consequently, the resultant polymeric bead products obtained by means of suspension polymerization techniques are biocidally-active. The various biocide-containing polymeric bead products produced by means of suspension polymerization techniques of the invention facilitate stability of their biocidal components, provide an advantageously prolonged period of biocidal activity due to their effectively slow release and further provide substantially increased weatherability for surfaces upon which these polymers have been coated.

EXAMPLE XI 600 grams of water were introduced into a one-liter, three-necked flask equipped with a stirring means, a reflux condenser and a thermometer. Next, an aqueous solution containing 7.27 grams of ammonium polyacrylate, obtained as "Acrysol G-110," having a solids content of about 22 weight percent, was admixed with the water in the reaction vessel. Subsequently, a mixture consisting of 198 grams of 2-ethylhexyl acrylate, 2 grams of diethylene glycol dimethacrylate, 21 grams of O,O-dimethyl O-(2,4,5-trichlorophenyl) phosphorothioate and 2 grams of azo-bis-isobutyronitrile was added to the aqueous phase which was being agitated at a rate of about 520 revolutions per minute (r.p.m.). Following the addition of the mixture of reactants, the vessel was purged with nitrogen and thereafter heated to a temperature of 65° C. The polymerization progressed under the prevailing reaction conditions for approximately 16 hours. The resultant biocide-containing polymer product in the form of soft beads was separated from the aqueous reaction medium.

EXAMPLE XII 600 grams of water were introduced into a one-liter, three-necked flask equipped with a stirring means, a reflux condenser and a thermometer. Next, an aqueous solution containing 7.27 grams of ammonium polyacrylate, obtained as "Acrysol G-110," having a solids content of about 22 weight percent, was admixed with the water in the reaction vessel. Subsequently, a mixture consisting of 198 grams of 2-ethylhexyl acrylate, 2 grams of diethylene glycol dimethacrylate, 20 grams of 4-tert.-butyl-2-chlorophenyl methyl methylphosphoramidate and 2 grams of azo-bis-isobutyronitrile was added to the aqueous phase which was being agitated at a rate of about 520 r.p.m. Following the addition of the mixture of reactants, the vessel was purged with nitrogen and thereafter heated to a temperature of 65° C. The polymerization progressed under the prevailing reaction conditions for approximately 16 hours. The resultant biocide-containing polymer product in the form of large soft brown beads was separated from the aqueous reaction medium.

EXAMPLE XIII

Into a two-liter flask equipped for stirring, heating, reflux, gas purge and liquid addition were placed 550 grams of water, 25 grams of di-t-butylphenoxy(polyethylene oxide)$_{40}$ and 25 grams of sodium octylphenoxy (polyethylene oxide)sulfonate. The mixture was heated to 75° C. and 2.5 grams of sodium persulfate were added. Immediately thereafter was begun the addition of a solution of 230 grams of butyl acrylate, 20 grams of methacrylic acid and 250 grams of the active insecticidal compound, O-(2,4-dichlorophenyl) O-propyl-n-methyl phosphoramidate. Addition of the feed solution to the reaction flask was continued for a period of one hour while the reaction temperature was maintained at about 80° C. When all of the feed solution had been introduced into the reaction flask, the reactants were subsequently heated at 80° C. for an additional hour. Thereafter, the reaction product was cooled to 25° C. while being stirred. The resultant biocidally-active butyl acrylate/methacrylic acid copolymer latex having the O-(2,4-dichlorophenyl) O-propyl-n-methyl phosphoramidate insecticide polymerically bound therein was observed to be smooth, stable and particle free.

EXAMPLE XIV

Employing the procedures and materials of Example XII, another satisfactory biocidally-active butyl acrylate/methacrylic acid copolymer latex product was prepared. However, in this experiment 140 grams of O,O-dimethyl O-p-nitrophenyl thiophosphate, the insecticidal compound obtained as "Methyl Parathion," was substituted in place of the 250 grams of the O-(2,4-dichlorophenyl) O-propyl-n-methyl phosphoramidate insecticidal compound of Example XIII.

EXAMPLE XV

Similar procedures and amounts of materials to those employed in Example XIII were used to prepare an additional smooth, stable, particle-free, biocidally-active butyl acrylate/methacrylic acid copolymer latex product. In this reaction, 80 grams of an effective herbicidal compound, O-(2,4-dichlorophenyl) O-methylisopropyl phosphoramidothioate, were dissolved in the butyl acrylate/methacrylic acid monomeric mixture prior to their polymerization in place of insecticidally-active, O-(2,4-dichlorophenyl) O-propyl-n-methyl phosphoramidate, employed in Example XIII.

EXAMPLE XVI 94 grams of O,O-diethyl O-p-nitrophenyl thiophosphate, an insecticide obtained as "Parathion," were employed in the recipe of Example XIII in place of the other active insecticidal compound. Using the above described procedures of Example XIII, a smooth, stable, particle-free, biocidally-active butyl acrylate/methacrylic acid copolymer latex was obtained having the O,O-diethyl O-p-nitrophenyl thiophosphate polymerically bound therein.

EXAMPLE XVII

| Oil phase: | G. |
|---|---|
| Styrene | 367 |
| Ethyl acrylate | 260 |
| Butyl acrylate | 39 |
| Methacrylic acid | 15 |
| O,O-dimethyl O-(2,4,5-trichlorophenyl) phosphorothioate | 818 |

Water phase: G.
Water _____ 1370
Dioctyl sodium sulfosuccinate _____ 2.5
Sodium styrene sulfonate _____ 0.45
Sodium persulfate _____ 4.55
Propylene glycol _____ 165

The above-described water phase solution with the exception of the sodium persulfate was introduced into a suitable polymerization reactor equipped with means for stirring, heating, refluxing, gas purging and liquid addition. The water phase was heated to a temperature of 75° C. Subsequently, the sodium pursulfate was added and immediately thereafter the gradual addition of the previously described oil phase solution was commenced. The oil phase addition continued for about one hour while the temperature of the reactor was maintained at about 80° C. When all of the oil phase solution had been admixed, the polymerization mixture was heated at 80° C. for an additional hour. The polymerization mixture was stirred continuously until it had cooled to about 25° C. The resultant biocidally-active styrene/ethyl acrylate/butyl acrylate/methacrylic acid quaternary interpolymer latex product having O,O-dimethyl O-(2,4,5,-trichlorophenyl) phosphorothioate polymerically bound therein was found to be smooth, stable and particle free.

EXAMPLE XVIII

Oil phase: G.
Styrene _____ 102
Butyl acrylate _____ 444
Acrylonitrile _____ 102
Methacrylic acid _____ 35
O,O-dimethyl O-(2,4,5-trichlorophenyl) phosphorothioate _____ 818
Water phase:
Water _____ 1281
Sodium octylphenoxy(polyethylene oxide)sulfonate _____ 44
Di-t-butylphenoxy(polyethylene oxide)$_{40}$ ____ 44
Sodium persulfate _____ 7.5
Propylene glycol _____ 165

Employing the procedures of Example XVII and the reaction ingredients described immediately above, another highly satisfactory biocidally-active quaternary interpolymer latex product was produced having O,O-dimethyl O-(2,4,5-trichlorophenyl) phosphorothioate polymerically bound therein.

EXAMPLE XIX

Into a suitably-sized citrate bottle were introduced the following:

Ingredients: G.
Water _____ 100
Sodium octylphenoxy(polyethylene oxide)sulfonate _____ 4.0
Nonylphenyl ether of tetraethylene glycol ____ 4.0
Ammonium persulfate _____ 1.6
Trisodium phosphate _____ 1.3
Propylene glycol _____ 19.0

A solution composed of 1.3 grams of 4-tert.-butyl-2-chlorophenyl methyl methylphosphoramidate dissolved in 40 grams of ethyl acrylate.

The bottle was chilled to a temperature of −50° C. whereupon 30 grams of liquid vinyl chloride were added. Subsequently, the bottle was sealed and tumbled at 50° C. for 20 hours. The biocidally-active latex product, thus prepared, was found to be smooth, particle free and stable.

EXAMPLE XX

Employing the procedures set forth in Example XVII, a highly satisfactory biocidally-active, film-forming, polymeric latex was prepared from the following materials:

Water phase: G.
Water _____ 312
Sodium octylphenoxy(polyethylene oxide)sulfonate _____ 15
Di-t-butylphenoxy(polyethylene oxide)$_{40}$ ____ 15
Sodium styrene sulfonate _____ 1.0
Sodium persulfate _____ 2.0
Oil phase:
Styrene _____ 157.5
O-(2,4-dichlorophenyl) O-propyl-n-methyl phosphoramidate _____ 157.5

EXAMPLE XXI

The film-forming, biocidally-active latex product of Example XX was diluted with water until latex dispersion was obtained having 0.15 weight percent O-(2,4-dichlorophenyl) O-propyl-n-methyl phosphoramidate content polymerically bound therein. Subsequently, a herd of cattle was sprayed with a suitable amount of dilute biocidally-active latex prepared according to the recipe of Example XX. It was observed that the cattle, thus sprayed, were effectively protected against infestation by hornflies for a period of three weeks.

In addition, when cattle infested with ticks were sprayed with the same biocidally-active polystyrene latex having a (O-(2,4-dichlorophenyl) O-propyl-n-methyl phosphoramidate content of 0.15 weight percent, a complete (100 percent) extermination of the ticks resulted.

EXAMPLE XXII

Employing the procedures of Example XVII and the water phase solution of Example XX, another satisfactory biocidally-active, film-forming, polymeric latex was prepared from an oil phase monomeric solution composed of 157.5 grams of O-(2,4-dichlorophenyl) O-propyl-n-methyl phosphoramidate, 110.25 grams of styrene, 31.5 grams of acrylonitrile and 15.75 grams of butyl acrylate.

What is claimed is:

1. Biocidally-active, water-insoluble, organic, polymeric material composed essentially of an admixture of from about 1.0 to about 75 weight percent of (A) a biocidally-active compound characterized by the formula:

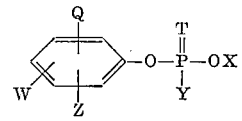

wherein Q, W and Z are selected from the group of substituents consisting of hydrogen, chlorine, bromine, nitro, lower alkyl containing from 1 to 5 carbons, inclusively, lower alkoxy containing from 1 to 5 carbons, inclusively, phenyl, benzyl, cyclohexyl; T is selected from the group consisting of oxygen and sulfur; X is selected from the group consisting of lower alkyl containing from 1 to 4 carbons, inclusively, and chlorophenylethyl; and Y is selected from the group consisting of lower alkoxy containing from 1 to 5 carbons, inclusively, and —NHR wherein R is selected from the group of substituents consisting of hydrogen and lower alkyl containing from 1 to 4 carbons, inclusively, said biocidally-active compound uniformly dispersed in from about 25 to about 99 weight percent of (B) at least one polymerizable monomeric olefinically unsaturated compound.

2. Biocidally-active, water-insoluble, organic, polymeric material composed essentially of an admixture of from about 1.0 to about 75 weight percent of (A) a biocidally-active compound characterized by the formula:

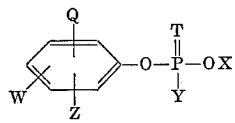

wherein Q, W and Z are selected from the group of substituents consisting of hydrogen, chlorine, bromine, nitro, lower alkyl containing from 1 to 5 carbons, inclusively, lower alkoxy containing from 1 to 5 carbons, inclusively, phenyl, benzyl, cyclohexyl; T is selected from the group consisting of oxygen and sulfur; X is selected from the group consisting of lower alkyl containing from 1 to 4 carbons, inclusively, and chlorophenylethyl; and Y is selected from the group consisting of lower alkoxy containing from 1 to 5 carbons, inclusively, and —NHR wherein R is selected from the group of substituents consisting of hydrogen and lower alkyl containing from 1 to 4 carbons, inclusively, said biocidally-active compound uniformly dispersed in from about 25 to about 99 weight percent of (B) at least one polymerizable monomeric olefinically unsaturated compound selected from the group consisting of (I) alkyl esters of acrylic acid wherein the alkyl is a member of the group consisting of primary and secondary alkyl containing 1–18 carbons; (II) glycidyl ester of monoethylenically unsaturated aliphatic monocarboxylic acids; (III) alkyl esters of methacrylic acid wherein the alkyl is a member of the group consisting of primary and secondary alkyl containing 1–18 carbons; (IV) diesters of alkylenediols with monoethylenically unsaturated aliphatic monocarboxylic acids; (V) acrylonitrile; (VI) methacrylonitrile; (VII) monovinyl aromatic hydrocarbons of the benzene series represented by the formula:

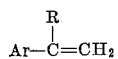

wherein Ar is selected from the group consisting of aryl and haloaryl and R is selected from the group of substituents consisting of hydrogen, $C_1$–$C_4$ alkyl, and halogen having an atomic number of from 17 to 35; (VIII) open-chain aliphatic conjugated dienes containing from 4 to 9 carbons; (IX) vinyl esters of aliphatic monocarboxylic organic acids having from 2 to 4 carbons in the alkyl substituent group; (X) allyl glycidyl ether; (XI) vinyl chloride; (XII) vinylidene chloride; and (XIII) an $\alpha,\beta$-monoethylenically unsaturated aliphatic carboxylic acid, the total compositional weight of components A and B being equal to 100 weight percent.

3. A coating composition comprised of an aqueous latex dispersion containing about 48 weight percent of non-volatile solids consisting of the individual particles of said latex dispersion, said particles being composed essentially of about 52 weight percent of O,O-dimethyl O-(2,4,5-trichlorophenyl) phosphorothioate and about 48 weight percent of a copolymer containing about 96 weight percent of butyl acrylate and about 4.0 weight percent of methacrylic acid as based on a total compositional weight of 100 percent.

4. An aqueous dispersion comprising a latex of a polymeric composition, said latex containing about 45 weight percent of non-volatile solids of individual particles of said latex, said particles composed essentially of a uniform admixture of O,O-dimethyl O-(2,4,5-trichlorophenyl) phosphorothioate and polymerized ethyl acrylate in a weight ratio of 3:1, respectively.

5. An aqueous dispersion comprising a latex of a polymeric composition, said latex containing about 45 weight percent of non-volatile solids of individual particles of said latex, said particles composed essentially of a uniform admixture of O,O-dimethyl O-(2,4,5-trichlorophenyl) phosphorothioate in a copolymer of styrene and ethyl acrylate, the biocidal component and copolymer being in a weight ratio of 1:1, respectively.

6. An aqueous dispersion comprising a latex of a polymeric composition, said latex containing about 45 weight percent of non-volatile solids of individual particles of said latex, said particles composed essentially of a uniform admixture of O,O-dimethyl O-(2,4,5-trichlorophenyl) phosphorothioate and polystyrene in a weight ratio of 1:10, respectively.

7. An aqueous dispersion comprising a latex of a polymeric composition, said latex containing about 40 weight percent of non-volatile solids of individual particles of said latex, said particles composed essentially of a uniform admixture of O,O-dimethyl O-(2,4,5-trichlorophenyl) phosphorothioate and a copolymer composed of about 60 weight percent copolymerized styrene and about 40 weight percent copolymerized butadiene, the biocidal component and copolymer component being in a weight ratio of 1:42, respectively.

8. An aqueous dispersion comprising a latex of a polymeric composition, said latex containing about 65 weight percent of non-volatile solids of individual particles of said latex, said particles composed essentially of a uniform admixture of O,O-dimethyl, O-(2,4,5-trichlorophenyl) phosphorothioate and polymerized vinyl acetate, the biocidal component and polymeric component being in a weight ratio of 1:19, respectively.

9. An aqueous dispersion comprising a latex of a polymeric composition, said latex containing about 45 weight percent of non-volatile solids of individual particles of said latex, said particles composed essentially of a uniform admixture of O,O-dimethyl O-(2,4,5-trichlorophenyl) phosphorothioate and a copolymer of vinyl acetate and ethyl acrylate, the biocidal component and copolymer being in a weight ratio of 1:1, respectively.

10. A viscous, homogeneous, biocidally-active, water-insoluble, organic, polymeric material composed essentially of about 89 weight percent of polymerized butyl acrylate having about 11 weight percent of O,O-dimethyl O-(2,4,5 - trichlorophenyl) phosphorothioate uniformly dispersed therein.

11. A viscous, biocidally-active, water-insoluble, organic, polymeric solution containing about 50 weight percent of non-volatile solids of a biocidally-active polymeric material composed of about 67 weight percent of copolymerized butyl acrylate, about 13 weight percent of copolymerized methacrylic acid and having about 20 weight percent of O,O-dimethyl O-(2,4,5-trichlorophenyl) phosphorothioate uniformly dispersed in said polymeric material as based on a total compositional weight of 100 percent, said biocidally-active, polymeric material being dissolved in a miscible, inert, organic solvent.

12. Biocidally-active, water-insoluble, organic, polymeric material in the form of a mass of individual polymerically constructed, soft beads composed essentially of a uniform admixture of 91 weight percent of a copolymer of about 97.8 weight percent of 2-ethylhexyl acrylate and about 2.2 weight percent of diethylene glycol dimethacrylate and about 9 weight percent of O,O-dimethyl O-(2,4,5-trichlorophenyl) phosphorothioate, as based on the total compositional weight of 100 percent.

13. Biocidally-active, water-insoluble, organic polymeric latex, the individual particles of which are composed essentially of a uniform admixture of 50 weight percent of a copolymer of about 92 weight percent of butyl acrylate, about 8 weight percent of methacrylic acid and 50 weight percent of O-(2,4-dichlorophenyl) O-propyl-n-methylphosphoramidate, the total compositional weight being based on 100 weight percent.

14. Biocidally-active, water-insoluble, organic, polymeric latex, the individual particles of which are composed essentially of a uniform admixture of 64 weight percent of a copolymer of about 92.8 weight percent of butyl acrylate, about 7.8 weight percent of methacrylic acid and 36 weight percent of O,O-dimethyl O-p-nitrophenyl thiophosphate, the total compositional weight being based on 100 weight percent.

15. Biocidally-active, water-insoluble, oragnic, polymeric latex, the individual particles of which are composed essentially of a uniform admixture of 75.5 weight percent of a copolymer of about 91.1 weight percent of butyl acrylate, about 8.9 weight percent of methacrylic acid and 24.5 weight percent of O-(2,4-dichlorophenyl) O-propyl-n-methyl phosphoramidate, the total compositional weight being based on 100 weight percent.

16. Biocidally-active, water-insoluble, oragnic, polymeric latex, the individual particles of which are composed essentially of a uniform admixture of 78 weight percent of a copolymer of about 89.7 weight percent of butyl acrylate, about 10.3 weight percent of methacrylic acid and 22 weight percent of O,O-diethyl O-p-nitrophenyl thiophosphate, the total compositional weight being based on 100 weight percent.

17. Biocidally-active, water-insoluble, oragnic, polymeric latex, the individual particles of which are composed essentially of a uniform admixture of 45.5 weight percent of an interpolymer of about 53.8 weight percent of styrene, about 38.4 weight percent of ethyl acrylate, about 5.5 weight percent of butyl acrylate, about 2.3 weight percent of methacrylic acid and 54.5 weight percent of O,O-dimethyl O-(2,4,5-trichlorophenyl) phosphorothioate the total compositional weight being based on 100 weight percent.

18. Biocidally-active, water-insoluble, organic, polymeric latex, the individual particles of which are composed essentially of a uniform admixture of 45.5 weight per cent of an interpolymer of about 15.2 weight percent of styrene, about 64.8 weight percent of butyl acrylate, about 15.2 weight percent of acrylonitrile, about 4.8 weight percent of methacrylic acid and 54.5 weight percent of O,O-dimethyl O-(2,4,5-trichlorophenyl) phosphorothioate, the total composition weight being based on 100 weight percent.

19. Biocidally-active, film-forming, water-insoluble organic polymer latex, the individual particles of which are composed essentially of a uniform admixture of 98 weight percent of a copolymer of about 42.9 weight percent of vinyl chloride, about 57.1 weight percent of ethyl acrylate and 2.0 weight percent of 4-tert.-butyl-2-chlorophenyl methyl methylphosphoramidate, as based on a total compositional weight of 100 weight percent.

20. Biocidally-active, water-insoluble, film-forming, organic, polymeric latex, the individual particles of which are composed essentially of a uniform admixture of 50 weight percent of polystyrene and 50 weight percent of O-(2,4-dichlorophenyl) O-propyl-n-methyl phosphoramidate, the total compositional weight being based on 100 weight percent.

21. An aqueous dispersion of the biocidally-active, film-forming latex of polystyrene having 0.15 weight percent of biocide, O-(2,4-dichlorophenyl) O-propyl-n-methyl phosphoramidate uniformly dispersed throughout the individual particles, said biocidally-active latex dispersion being adapted to be employed as an insecticidal coating for application to the hides of animals.

22. Biocidally-active, water-insoluble, film-forming, organic, polymeric latex, the individual particles of which are composed essentially of a uniform admixture of 50 weight percent of an interpolymer of about 70 weight percent of styrene, about 20 weight percent of acrylonitrile, about 10 weight percent of butyl acrylate and 50 weight percent of O-(2,4-dichlorophenyl) O-propyl-n-methyl phosphoramidate, the total compositional weight being based on 100 weight percent.

23. A polymerization process for the preparation of a biocidally-active, organic ethenoid polymer comprised of heat-reacting an ethenoid monomer-biocide solution composed of (A) from about 1.0 to about 75 weight percent as based on 100 weight percent of total compositional weight of a biocidally-active, organic, ethenoid monomer-soluble compound characterized by the formula:

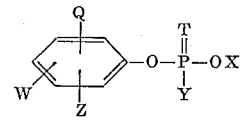

wherein Q, W and Z are selected from the group of substituents consisting of hydrogen, chlorine, bromine, nitro, lower alkyl containing from 1 and 5 carbons, inclusively, lower alkoxy containing from 1 and 5 carbons, inclusively, phenyl, benzyl, cyclohexyl; T is selected from the group consisting of oxygen and sulfur atoms; X is selected from the group consisting of lower alkyl containing from 1 to 4 carbons, inclusively, and chlorophenylethyl; and Y is selected from the group consisting of lower alkoxy containing from 1 to 5 carbons, inclusively, and —NHR wherein R is selected from the group of substituents consisting of hydrogen and lower alkyl containing from 1 to 4 carbons, inclusively, and from about 25 to about 99 weight percent of (B) at least one polymerizable monomeric olefinically unsaturated compound.

24. The polymerization process of claim 23, wherein said polymerizable, monomeric, olefinically unsaturated compound is selected from the group consisting of (I) alkyl esters of acrylic acid wherein the alkyl is a member of the group consisting of primary and secondary alkyl containing 1–18 carbons; (II) glycidyl esters of monoethylenically unsaturated aliphatic monocarboxylic acids; (III) alkyl esters of methacrylic acid wherein the alkyl is a member of the group consisting of primary and secondary alkyl containing 1–18 carbons; (IV) diesters of alkylenediols with monoethylenically unsaturated aliphatic monocarboxylic acids; (V) acrylonitrile; (VI) methacrylonitrile; (VII) monovinyl aromatic hydrocarbons of the benzene series represented by the formula:

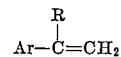

wherein Ar is selected from the group consisting of aryl and haloaryl and R is selected from the group consisting of hydrogen, $C_1$–$C_4$ alkyl, and halogen having an atomic number of from 17 to 35; (VIII) open-chain aliphatic conjugated dienes having from 4 to 9 carbons; (IX) vinyl esters of organic aliphatic monocarboxylic acids having from 2 to 4 carbons in the acid substituent group; (X) allyl glycidyl ether; (XI) vinyl chloride; (XII) vinylidene chloride; and (XIII) α,β-monoethylenically unsaturated aliphatic carboxylic acids.

25. The process of claim 23, wherein said biocidally-active, organic, ethenoid monomer-soluble compound is O,O-dimethyl O-(2,4,5-trichlorophenyl) phosphorothioate.

26. The process of claim 25, wherein said polymerizable, monomeric, olefinically unsaturated compound is a monomer composed of about 100 weight percent of butyl acrylate.

27. The process of claim 25, wherein said polymerizable, monomeric, olefinically unsaturated compound is a monomer mixture composed in percent by weight of about 84 percent of butyl acrylate and about 16 percent of methacrylic acid, the total compositional weight of said monomer mixture being based on 100 weight percent.

28. The process of claim 25, wherein said polymerizable monomeric, olefinically unsaturated compound is a monomer composed of 100 weight percent of 2-ethylhexyl acrylate.

29. An emulsion polymerization process for the preparation of biocidally-active, organic, ethenoid polymers having a non-volatile solids content of individual polymer particles of from about 20 to about 75 weight percent as based on a total non-volatile solids content of 100 weight percent which process comprises (1) preparing a monomer-biocide solution by dissolving a solid crystalline biocide in a liquid ethenoid monomer, said solution being composed essentially of from about 1.0 to about 75 weight percent as based on the total weight of non-volatile latex solids of (A) a biocidally-active, organic, ethenoid monomer-soluble compound characterized by the formula:

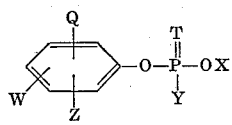

wherein Q, W and Z are selected from the group of substituents consisting of hydrogen, chlorine, bromine, nitro, lower alkyl containing from 1 to 5 carbons, inclusively, lower alkoxy containing from 1 to 5 carbons, inclusively, phenyl, benzyl, cyclohexyl; T is selected from the group consisting of oxygen and sulfur atoms; X is selected from the group consisting of lower alkyl containing from 1 to 4 carbons, inclusively, and chlorophenylethyl; and Y is selected from the group consisting of lower alkoxy containing from 1 to 5 carbons, inclusively, and —NHR wherein R is selected from the group of substituents consisting of hydrogen and lower alkyl containing from 1 to 4 carbons, inclusively, and from about 25 to about 99 weight percent of (B) at least one polymerizable monomeric olefinically unsaturated compound;

(2) dissolving a catalyst and an emulsifier in distilled water;

(3) heating the polymerization reaction media;

(4) incrementally adding said monomer-biocide solution to the heated polymerization reaction media while maintaining the temperature of the reaction in the range of from about 75° C. to about 85° C. under autogenous pressure of from about atmospheric pressure to about 150 pounds per square inch of pressure; and (5) continuing the polymerization under reaction conditions of (4) until conversion of monomer to polymer is substantially complete.

30. The emulsion polymerization process of claim 29, wherein said polymerizable, monomeric, olefinically unsaturated compound is selected from the group consisting of (I) alkyl esters of acrylic acid wherein the alkyl is a member of the group consisting of primary and secondary alkyl containing 1–18 carbons; (II) glycidyl esters of monoethylenically unsaturated aliphatic monocarboxylic acids; (III) alkyl esters of methacrylic acid wherein the alkyl is a member of the group consisting of primary and secondary alkyl containing 1–18 carbons; (IV) diesters of alkylenediols with monoethylenically unsaturated aliphatic monocarboxylic acids; (V) acrylonitrile; (VI) methacrylonitrile; (VII) monovinyl aromatic hydrocarbons of the benzene series represented by the formula:

$$\text{Ar}-\overset{\text{R}}{\underset{|}{\text{C}}}=\text{CH}_2$$

wherein Ar is selected from the group consisting of aryl and haloaryl and R is selected from the group consisting of hydrogen, $C_1$–$C_4$ alkyl, and halogen having an atomic number of from 17 to 35; (VIII) open-chain aliphatic conjugated dienes having from 4 to 9 carbons; (IX) vinyl esters of organic aliphatic monocarboxylic acids having from 2 to 4 carbons in the acid substituent group; (X) glycidyl ether; (XI) vinyl chloride; (XII) vinylidene chloride; and (XIII) α,β-monoethylenically unsaturated aliphatic carboxylic acids.

31. The process of claim 29, wherein said biocidally-active, organic, ethenoid monomer-soluble compound is O,O-dimethyl O-(2-4,5-trichlorophenyl) phosphorothioate.

32. The process of claim 31, wherein said polymerizable monomeric olefinically unsaturated compound is monomer of ethyl acrylate.

33. The process of claim 31, wherein said polymerizable monomeric olefinically unsaturated compound is a monomer mixture composed, in percent by weight, of about 50 percent of styrene and 50 percent of ethyl acrylate, the total compositional weight of said monomer mixture being equal to 100 weight percent.

34. The process of claim 31, wherein said polymerizable monomeric olefinically unsaturated compound is a monomer of styrene.

35. The process of claim 31, wherein said polymerizable monomeric olefinically unsaturated compound is a monomer mixture composed, in percent by weight, of about 60 percent of styrene and about 40 percent of butadiene, the total compositional weight of said monomer mixture being equal to 100 weight percent.

36. The process of claim 31, wherein said polymerizable monomeric olefinically unsaturated compound is a monomer of vinyl acetate.

37. The process of claim 31, wherein said polymerizable monomeric olefinically unsaturated compound is a monomer mixture composed, in percent by weight, of about 50 percent of vinyl acetate and about 50 percent of ethyl acrylate.

38. The process of claim 31, wherein said polymerizable monomeric olefinically unsaturated compound is a monomer mixture composed, in percent by weight, of about 54 percent of styrene, about 38 percent of ethyl acrylate, about 5.5 percent of butyl acrylate, and about 2.5 percent of methacrylic acid, the total compositional weight of said monomer mixture being equal to 100 weight percent.

39. The process of claim 31, wherein said polymerizable monomeric olefinically unsaturated compound is a monomer mixture composed, in percent by weight, of about 15 percent of styrene, about 65 percent of butyl acrylate, about 15 percent of acrylonitrile, and about 5 percent of methacrylic acid, the total compositional weight of said monomer mixture being equal to 100 weight percent.

40. The process of claim 29, wherein said biocidally-active, organic, ethenoid monomer-soluble compound is O-(2,4-dichlorophenyl) O-propyl-n-methyl phosphoramidate.

41. The process of claim 40, wherein said polymerizable monomeric olefinically unsaturated compound is a monomer mixture composed, in percent by weight, of about 92 percent of butyl acrylate and about 8 percent of methacrylic acid, the total compositional weight of said monomer mixture being equal to 100 weight percent.

42. The process of claim 40, wherein said polymerizable monomeric olefinically unsaturated compound is a monomer of styrene.

43. The process of claim 40, wherein said polymerizable monomeric olefinically unsaturated compound is a monomer mixture composed, in percent by weight, of about 70 percent of styrene, about 20 percent of acrylonitrile, and about 10 percent of butyl acrylate, the total compositional weight of said monomer mixture being equal to 100 weight percent.

44. The process of claim 29, wherein said biocidally-active, organic, ethenoid monomer-soluble compound is 4-tertiary-butyl-2-chlorophenyl methyl methylphosphoramidate.

45. The process of claim 44, wherein said polymerizable monomeric olefinically unsaturated compound is a monomer mixture composed, in percent by weight, of about 43 percent of vinyl chloride and about 57 percent of ethyl acrylate, the total compositional weight of said monomer mixture being equal to 100 weight percent.

46. The process of claim 29, wherein said biocidally-active, organic, ethenoid monomer-soluble compound is O,O-dimethyl O-p-nitrophenyl thiophosphate.

47. The process of claim 46, wherein said polymerizable monomeric olefinically unsaturated compound is a monomer mixture composed, in percent by weight, of about 92 percent of butyl acrylate and about 8 percent of methacrylic acid, the total compositional weight of said monomer mixture being equal to 100 weight percent.

References Cited by the Examiner
UNITED STATES PATENTS

| | | | |
|---|---|---|---|
| 2,577,041 | 12/51 | Seymour | 167—42 |
| 2,624,690 | 1/53 | Leader | 167—42 |
| 2,750,323 | 6/56 | Schmitz et al. | 167—42 |
| 2,831,015 | 4/58 | Tolkmith | 167—30 |
| 2,873,263 | 2/59 | Lal | 167—42 |
| 2,897,226 | 6/59 | Britton et al. | 167—30 |
| 2,919,200 | 12/59 | Dubin et al. | 167—42 |
| 2,928,864 | 3/60 | Tabor | 167—30 |
| 2,929,762 | 3/60 | Wasco et al. | 167—30 |

FOREIGN PATENTS 592,670  9/47  Great Britain.

JULIAN S. LEVITT, *Primary Examiner.*
LEWIS GOTTS, *Examiner.*

UNITED STATES PATENT OFFICE
CERTIFICATE OF CORRECTION

Patent No. 3,212,967                                     October 19, 1965

Russell T. McFadden et al.

It is hereby certified that error appears in the above numbered patent requiring correction and that the said Letters Patent should read as corrected below.

Column 7, line 8, for "carred" read -- carried --; column 8, line 37, for "peroxde" read -- peroxide --; line 70, for "atmospheric" read -- superatmospheric --; line 72, for "satisfactor ily" read -- satisfactorily --; column 11, line 11, for "diocide-monomer" read -- biocide-monomer --; lines 69 and 70, for "polymerizazble" read -- polymerizable --; column 14, line 35, for "XII" read -- XIII --; column 15, line 12, for "pursulfate" read -- persulfate --; column 16, line 27, for "(0-(2,4-" read -- 0-(2,4- --; column 19, lines 6, 14 and 22, for "oragnic", each occurrence, read -- organic --; same column 19, line 40, for "composition" read -- compositional --; column 22, line 6, after "is" insert -- a --.

Signed and sealed this 25th day of October 1966.

(SEAL)
Attest:

ERNEST W. SWIDER                                      EDWARD J. BRENNER
Attesting Officer                                   Commissioner of Patents